W. C. PITTER.
MEANS FOR CUTTING SCREW GAUGES.
APPLICATION FILED MAR. 5, 1918.
1,433,844.
Patented Oct. 31, 1922.
2 SHEETS—SHEET 1.
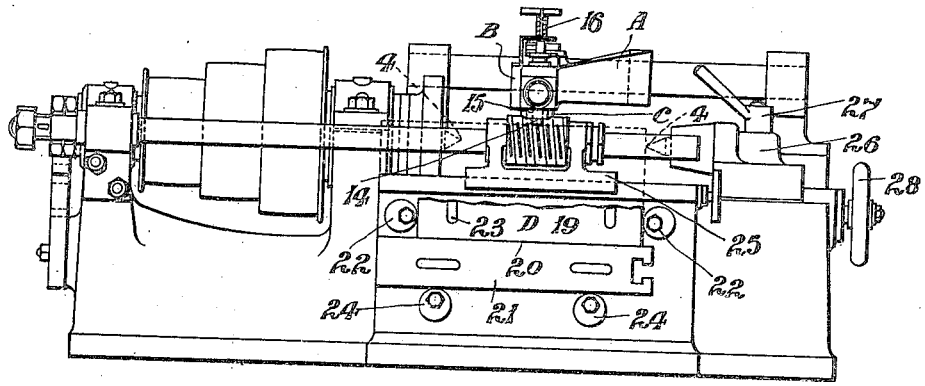
Fig.1.
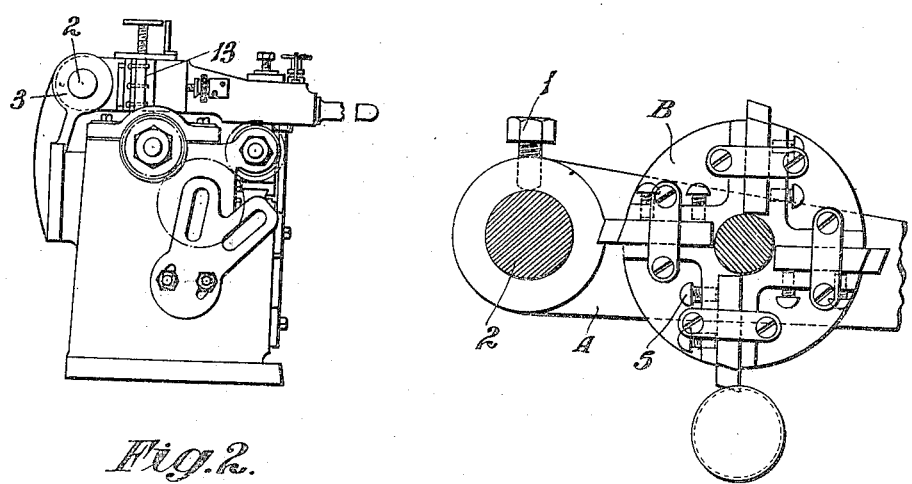
Fig.2.
Fig.5.
Inventor.
Walter Charles Pitter,
By- B Sniger. Atty.

Patented Oct. 31, 1922.

1,433,844

UNITED STATES PATENT OFFICE.

WALTER CHARLES PITTER, OF ELTHAM, ENGLAND.

MEANS FOR CUTTING SCREW GAUGES.

Application filed March 5, 1918. Serial No. 220,595.

*To all whom it may concern:*

Be it known that I, WALTER CHARLES PITTER, a subject of the King of Great Britain, and a resident of Eltham, Kent, England, have invented certain new and useful Improvements in Means for Cutting Screw Gauges (for which I filed application for patent in Great Britain, No. 427, dated January 9, 1917), of which the following is a specification.

This invention relates to an improved machine for cutting screw gauges, and has for its object to provide a machine by means of which screw gauges can be cut by unskilled or partly skilled labour. The invention has reference to that type of machine wherein a nut co-operates with a leading screw, and the invention consists in providing means for ensuring that degree of accuracy necessary to the production of guages.

Among the features of primary importance may be specifically mentioned the provision of means whereby the nut which co-operates with the leading screw is always in full engagement with the screw and this involves the provision of a spring controlled nut carried by a pivoted lever. Further features are the particular means of adjustment, the arrangement of the tool carrying device or box and the arrangement whereby the final cutting position is adjusted and controlled.

In the accompanying drawings I have illustrated my invention,

Fig. 1 being a front elevational view of a machine constructed in accordance with the invention.

Fig. 2 is an end view thereof.

Fig. 5 illustrates a modified form of the tool holder carried by the pivoted lever.

Figure 3:
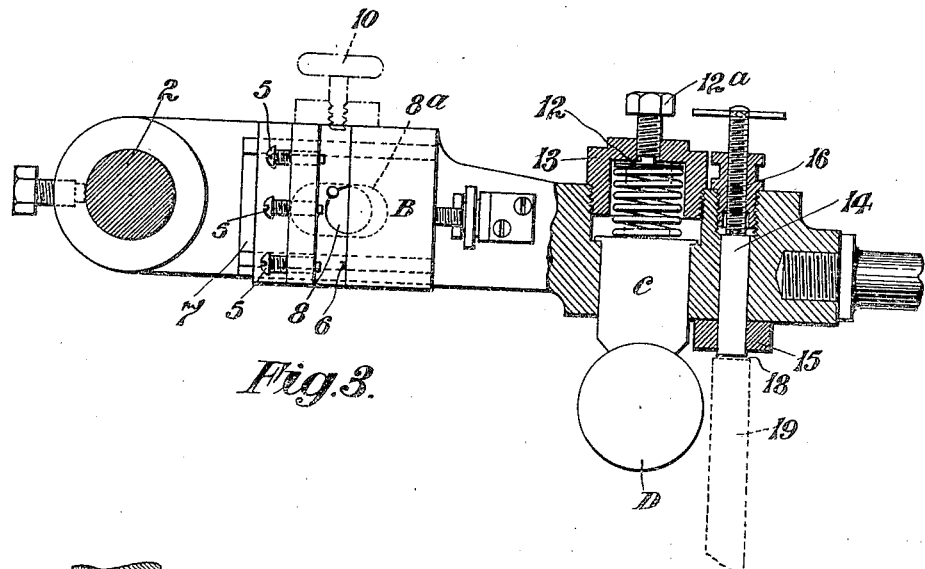
Fig. 3 is an elevational view of the pivoted lever carrying the nut which co-operates with the leading or copy screw.

Referring to these drawings A designates a lever which carries both the tool holder B and the controlling nut C, and this lever is rigidly but adjustably secured by means of set screws 1 or the like upon a back bar or shaft 2 which is slidably mounted in suitable bearings 3 on the machine frame and in the operation of the machine this back bar or shaft 2 carrying the lever A as a whole is carried from one side to another by the co-operation of the controlling nut C with the continuously rotating leading screw D as will be readily understood by persons conversant with this general type of machine, and in order to prevent any undue jar or vibration consequent upon the too rapid return of the back bar or shaft after each cut a dash-pot or other such device not shown may be provided. This back bar or shaft 2 may be returned to initial or starting position after each cut by hand or automatic means may be provided for this purpose. The lever A and back bar or shaft 2 aforesaid both move together and the lever carries a tool box B so located that the operative tool is exactly over the centre of the work which rotates between centres 4 in the usual manner, and means are provided whereby the tool can be adjusted for the required cut and also whereby the tool box can be bodily adjusted in a horizontal direction so as to move the tool slightly to either side of the centre line, and by means of this adjustment slight difference in the depth of cut and relative sizes of core, and major measurements can be provided for. The tools are held in the tool holder B by means of set screws 5 and it will be seen that the arrangement is such that the tool always registers with true faces 6 and always adopts the correct position irrespective of differences in size consequent upon the sharpening of the tool.

Figure 4:
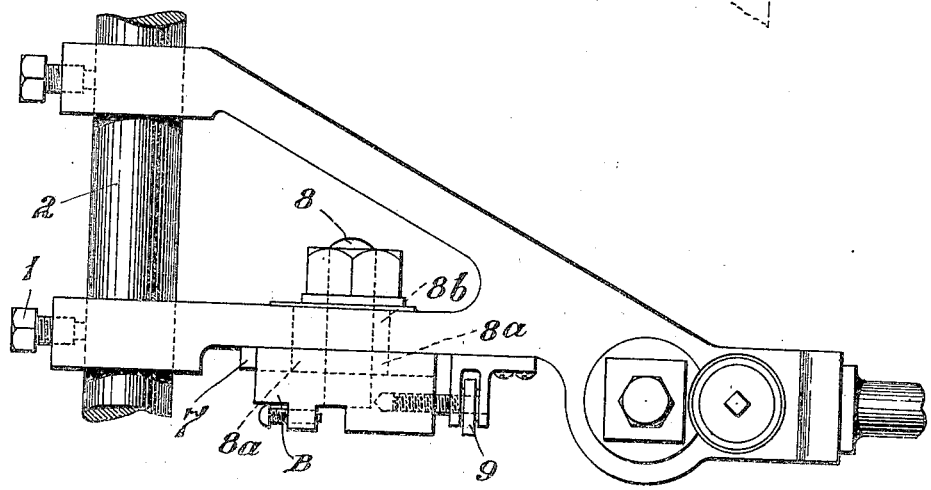
Fig. 4 is a plan view thereof.

One form of tool holder is shewn in Figs. 3 and 4. It is supported upon a guide 7 and is secured in position by a bolt 8, slots 8ª and 8ᵇ being provided in the guide 7 and the lever A respectively. The position of the tool holder as a whole can be adjusted horizontally by means of the adjusting screw 9 and if angular adjustment is also required this can be effected by having the tool pivotally mounted upon its tang which is gripped by the set screws 5 or by adjustment of the guide 7 and holder B about the axes of the bolt 8. An adjusting screw 10 such as indicated in dotted lines may be provided for adjusting the tool finitely to the work and this adjustment can be effected after the tool has been partially gripped by the set screws 5 the power afforded by the screw being sufficient to move the tool against the frictional resistance of the set screws.

Another form of tool holder is illustrated in Fig. 5 and is of circular form and adapted to hold four tools as shewn each of which can be brought into operative position and adjusted as required. By this means two or three roughing tools and a finishing tool may be provided so that no delays occur when any particular tool becomes blunt. The tool box holder is located between the back bar or shaft 2 and the controlling nut C. This controlling nut C which is really only a partial nut is slidable vertically in the lever A and is pressed out by means of a compression spring 12 operating between its upper end and a securing nut 13. If desirable a screw or other adjustment indicated at 12$^a$ in Fig. 3 may be provided in order to provide means for varying the effective tension or compression of the spring 12. The nut C is so located that a vertical line through its centre passes substantially through the centre of the leading screw D with which it engages when the machine is in operation. Adjacent this controlling nut and also carried by the lever I provide the adjusting device and gauge stop 14 and 15 respectively to which the unskilled operator works. This adjusting device consists of a vertically slidable stop 14 adjustable as to depth by means of a screw 16. The lower face of this stop is perfectly true and passes through the fixed gauge stop 15 to which the operator works which gauge stop 15 co-operates with a perfectly true upper face 18 on a front stationary bar 19 running parallel with the leading screw. This front bar may be provided with a lower inclined surface 20 which co-operates with another inclined upper surface of an adjustable plate 21 so that by adjusting it horizontally in respect of the co-operating inclined surface finite adjustment of its height may be provided for.

One form of adjustment is shewn in Fig. 1. By means of the eccentrics 22 and slots 23 the stationary bar 19 is constrained to move only in a vertical direction and by means of the eccentrics 24 both the stationary bar 19 and the plate 21 can be adjusted bodily to approximately the desired position. By sliding the plate 21 horizontally relatively to the bar 19 finite adjustment is provided through the co-operating inclined surface above referred to. Of course other suitable means of adjustment may be provided.

The vertical slots 23 in the bar 19 and the horizontal slots in the plate 21 are of such a size relative to the locking screws which project through them as will permit of slight lateral movements being imparted to said bar and plate by means of the eccentrics 22 and 24 for the purposes of finite adjustment.

Both the stop 14 and gauge stop 15 are carried by the lever and this bar 19 and plate 21 may be calibrated so that accurate settings can be readily accomplished. It will be understood that the correct setting is obtained by setting the tool down to the work—or to a sizing gauge—when the fixed stop 14 is at rest on the top surface of the bar 19, and adjustment of a very finite character can be obtained by adjustment of the stationary bar 19 as before described. The leading screw D is an accurately cut screw of comparatively short length and may be geared to rotate at the same speed as the work. This leading screw is carried in cone bearings in a bracket 25 mounted to slide in V or dovetail grooves or guides so as to ensure parallelism, and means may be provided for finite adjustment of the position of the bracket so that adjustment can be made for cases where, by reason of a screw having been roughed on another machine, the cutter on the finishing machine is not in absolutely correct alignment with the thread.

The tail stock or poppet 26 has a fixed centre and is held in position to the bed of the machine by means of a bolt and nut fastening 27 but finite adjustment of this tail stock is provided for by means of a micrometer adjusting screw 28.

It will be appreciated from the foregoing that the machine having once been accurately set, all the operator has to do is to lower the lever A so that the spring pressed controlling nut C is in engagement with the leading screw D, and by reason of the spring 12 it will be seen that this nut C is always in complete engagement with the thread of the leading screw D. The screw gauge being cut will be cut by adjustment of the cut from time to time by moving the stop 14 up by means of the adjusting screw 16 and when the gauge stop 15 on the lever comes into engagement with the front stationary bar no further cutting can be effected. That is to say when the cutting operation commences the bottom of the stop 14 will protrude below the bottom of the gauge stop 15 and as the stop 14 is raised the cut will be increased but as soon as the bottom of the stop 14 co-incides with the bottom of the gauge stop 15 no further cutting can be effected although the operator may seek to do so by further adjustment of the stop 14. It thus follows that the operator requires very little skill as he or she simply continues the cutting until the gauge stop 15 reaches the bar 19.

What I claim and desire to secure by Letters Patent is:—

1. In a machine for cutting screw gauges, an arm mounted for reciprocating movement and also for vertical pivotal movement and provided with a tool holder, a leading screw parallel with the path of reciprocating movement of said arm, work holding means, a nut to engage the leading screw and mounted for vertical movement in the said arm, a spring bearing downwardly on said nut, a fixed gauge stop, and a vertically adjustable stop each carried by said arm, and a relatively fixed bar having a true face on which said stops operate.

2. In a machine for cutting screw gauges, an arm mounted for reciprocating movement and also for vertical pivotal movement and provided with a tool holder, a leading screw parallel with the path of reciprocating movement of said arm, work holding means, a nut to engage the leading screw and mounted for vertical movement in the said arm, a spring bearing downwardly on said nut, a fixed gauge stop, and a vertically adjustable stop each carried by said arm, a relatively fixed bar having a true face on which said stops operate, and means to effect finite adjustment of said relatively fixed bar.

In testimony whereof I affix my signature.

WALTER CHARLES PITTER.